(12) United States Patent
Risson et al.

(10) Patent No.: US 7,443,552 B2
(45) Date of Patent: Oct. 28, 2008

(54) PROCESS OF SPATIAL COLOR RESTORATION OF AN IMAGE

(75) Inventors: Valéry J. Risson, Barcelone (ES); Jean-Fabien Dupont, Chalon sur Saone (FR)

(73) Assignee: Eastman Kodak Company, Rochester, NY (US)

( * ) Notice: Subject to any disclaimer, the term of this patent is extended or adjusted under 35 U.S.C. 154(b) by 859 days.

(21) Appl. No.: 10/519,298

(22) PCT Filed: Jun. 7, 2003

(86) PCT No.: PCT/EP03/06006

§ 371 (c)(1), (2), (4) Date: Dec. 22, 2004

(87) PCT Pub. No.: WO04/001669

PCT Pub. Date: Dec. 31, 2003

(65) Prior Publication Data

US 2005/0237586 A1    Oct. 27, 2005

(30) Foreign Application Priority Data

Jun. 24, 2002   (FR)   .................. 02 07759

(51) Int. Cl.
   *G03F 3/00*   (2006.01)
(52) U.S. Cl. ............... 358/518; 382/162; 382/164; 382/167; 382/254; 382/260
(58) Field of Classification Search .......... 358/518; 382/162, 164, 167, 254, 260
See application file for complete search history.

(56) References Cited

U.S. PATENT DOCUMENTS

| | | | | |
|---|---|---|---|---|
| 4,409,614 A | * | 10/1983 | Eichler et al. | 358/530 |
| 5,796,874 A | * | 8/1998 | Woolfe et al. | 382/254 |
| 5,920,831 A | * | 7/1999 | Pringle et al. | 702/127 |
| 2003/0002747 A1 | * | 1/2003 | Zaklika et al. | 382/260 |

OTHER PUBLICATIONS

Geschwind R, "Restoration of Faded Colour Photographs by Digital Image Processing", Journal of Photographic Science, Royal Photographic Society, London, GB, vol. 38, No. 4/5, 1990, pp. 193-196, XP000159933; ISSN: 0022-3638.

* cited by examiner

*Primary Examiner*—Samir A Ahmed
*Assistant Examiner*—Michael Vanchy, Jr.
(74) *Attorney, Agent, or Firm*—David A. Novais

(57) ABSTRACT

The process of the invention enables the spatial color alterations of a silver image to be taken into account according to one of its main axes (19). The process of the invention enables the altered or faded colors of the silver image to be restored automatically, without depending on the skills of an operator to perform a color restoration treatment. A digital image (12) is divided into adjacent pixel strips (18), arranged perpendicular to the direction (19) according to which the color alteration occurs. For each of these strips (18), optical density distributions of each pixel are calculated and compared with reference optical density values. The process of the invention enables the automatic correction of all the strips (18) comprising the altered pixels, by applying a linear transformation enabling the transformation of the optical density values of the altered pixels, into the optical density values of a pixel strip of least degradation. The process of the present invention is used in the technological field of the restoration of color photographic images.

10 Claims, 3 Drawing Sheets

PROCESS OF SPATIAL COLOR RESTORATION OF AN IMAGE

FIELD OF THE INVENTION

The present invention is in the technical field of imaging. The object of the present invention is an automatic process of color restoration of an image; after said color has been altered with regard to the original color of the image.

BACKGROUND OF THE INVENTION

The renovation or restoration of color images recorded on silver supports is usually done by processing a digitized version of these altered silver images. The restoration of altered images enables, by visual examination, the image to recover its original colors. The conventional silver supports of the images generally comprise photographic film or paper. In the following description, a silver image means a color image obtained from silver halide photographic emulsions. The alteration or degradation of color images recorded on these silver supports is due for example to aging, or to the exposure of these silver supports to light sources, at the time of handling. Restoration processes of image colors, known to those skilled in the art, consist for example in digitizing an image previously recorded on a silver support (photographic film or paper), and then processing the digitized image in order to restore its colors. These restoration processes consist in transforming the degraded colors on the digitized image, by using the algorithms of image processing software.

The digital image, transformed by the processing, thus has restored colors that approximately match those of the original image.

U.S. Pat. No. 5,796,874 describes the restoration of images printed on a material support, for example paper type, discolored or faded over time. This patent describes a method and means that enable an operator without a high level of skill, to easily restore an image whose colors have been altered. The operator in particular does not have to select and add filters in the scanner used to digitize the image to be restored. But, the operator has to apply image degradation models over time to the image to be restored. That is the restoration is done according to the selection of a time variable: for example, it is assumed that the image is some ten years old and the restoration model for this time (some ten years) is applied in order to restore the colors of the altered image. The restoration method enables a restoration model of the image colors to be obtained and selected automatically, according to a time variable assigned to the image. The image restored in this way can be displayed on a monitor type screen. In addition, the operator can also select another model, linked to another time variable, if the first restoration result was not satisfactory. The correction rule used is applied uniformly to the entire image.

The document of the University of La Rochelle, France, by M. Chambah and B. Besserer, entitled "Digital Color Restoration of Faded Motion Pictures", and presented to the first International CGIP Conference (Color in Graphics and Image Processing) in Saint-Etienne, France, October 1-4, 2000, describes a method of color restoration of faded images on old films. Firstly, the film is digitized with a scanner; then the coverage effect of the spectral densities of the various dyes is subtracted, by using an adjustment matrix. Secondly, the color channels of the image are balanced using another correction matrix. Finally, the contrast is increased to improve the visual quality. In this method, the correction rule used is applied uniformly to the entire image.

In an article (IEEE Transactions On Image Processing, Volume 9, No. 5, May 2000), entitled "Adaptive Image Contrast Enhancement Using Generalizations of Histogram Equalization", J. Alex Stark describes a method of contrast enhancement in an image. This method uses a cumulative function of gray levels in a zone or a window (for example with square shape) around a pixel, without interdependence constraint between these zones. The corrections are independent for each image representation zone.

The restoration means of the prior art do not take into account the spatial variations of the alteration of colors in an image. The means of the prior art use mathematical models or functions that take into account certain important parameters that influence the degradation of the colors of an image recorded on photographic film or paper, to then restore the colors of the entire image uniformly.

SUMMARY OF THE INVENTION

The process of the present invention, for the spatial restoration of the colors of an altered image, enables, from the detection of alterations or degradations of color that vary spatially from one edge to the other of the image, color restoration according to the original colors of said image. The advantage of this invention process is to restore automatically, rapidly, and reliably the original colors of the image, whereas said colors had not been uniformly altered.

More particularly, the invention relates to an automatic process of restoration of the color of a silver image whose color is altered non-uniformly with regard to the original color of the silver image, spatially in the plane of the silver image, and according to a direction parallel to one main axis of the image; this process comprises the following steps:

a) digitize the altered silver image by using a measuring scale of optical densities;

b) filter all the pixels of the digitized image;

c) divide the digital image into pixel strips arranged perpendicular to the direction of the main axis of the image according to which the color alteration occurs, the joining of all the pixels of each strip representing all the pixels of the digital image;

d) calculate, for each pixel strip, and for each of the color channels forming the image, a distribution of the optical densities of the pixels forming said strip;

e) calculate, for each of said distributions of step d), a top crude reference value of optical density, and a bottom crude reference value of optical density;

f) calculate, from all the top and bottom crude reference values of step e), the corresponding top filtered reference values of optical density and bottom filtered reference values of optical density, g) determine, from the top and bottom filtered reference values of optical density of step f), top reference curves of optical density and bottom reference curves of optical density, said reference curves being representative of the color degradation profile of the image;

h) determine, for each of the color channels forming the image, and from the maximum value of optical density of the top reference curve of optical density, the pixel strip of least degradation;

i) apply to each pixel strip of the digital image other than the pixel strip of least degradation, and to each of the color channels forming the image, a linear transformation enabling the transformation of the optical density filtered values placed on the top reference curve and on the bottom reference curve of optical density of said each pixel strip, respectively into top and bottom values of optical density of the pixel strip of least degradation.

The process of the invention enables a restored image to be obtained. One characteristic of the invention, which is shown by a major advantage with regard to the prior art, is to take into account the non-uniform spatial variations of color having altered for example a silver image. This process enables the automatic restoration of the faded colors of the image, without bringing in the photographic skills of an operator. Another advantage of the process of the invention to execute color restorations of altered or faded images is the time saved, and consequently increased productivity, with regard to manual treatment of the spatial restoration of images by an operator.

Other characteristics and advantages will appear on reading the description, with reference to the drawings of the various figures.

DETAILED DESCRIPTION OF THE INVENTION

Figure 1:
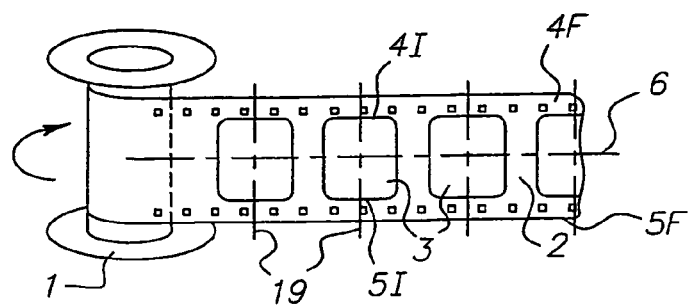
FIG. 1 represents diagrammatically a color photographic film and its winding means.

The following description is a detailed description of the invention with reference to the drawings in which the same numerical references identify the same elements in each of the different figures.

The process of the invention is used to automatically restore the colors of an image whose color is altered, i.e. faded with regard to the original color of the image. The images to be restored may be still or animated. Still images are for example color photographs (portraits, landscapes, etc.). Animated images are for example sequences of motion picture film. These images are recorded on silver photographic supports. The problem of the non-homogeneous alteration of the colors of images recorded on a silver photographic support is found especially when, according to FIG. 1, these silver image supports 2 are wound on reels 1. A silver image support is for example a motion picture film recorded in color. Over time or following uncontrolled temperature and/or hygrometry variations, degradation of the dyes occurs. In practice, the degradation of the dyes of the image occurs more strongly on the edges 4F, 5F than in the center of the film 2. The line showing the middle of the film 2 and the silver images 3 is represented by a first main axis 6.

Figure 2:
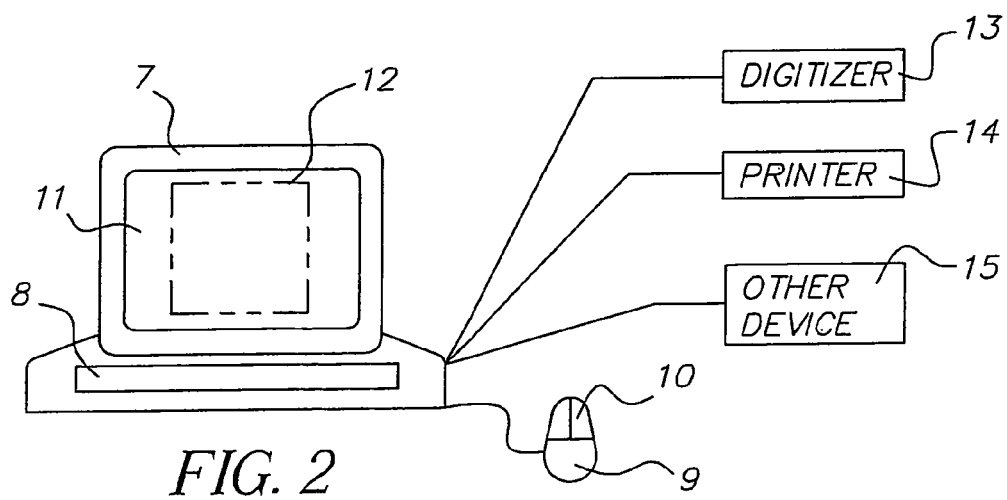
FIG. 2 represents diagrammatically a hardware environment used for example to implement the invention process.

FIG. 2 shows a preferred hardware environment used to implement the invention process interactively. An operator who wishes for example to restore one or more original images 3 whose colors have been altered over time with regard to the original color, uses a terminal 7. The terminal 7 is for example a personal computer or PC comprising a keyboard 8 and a display screen 11. The terminal 7 is interfaced with a mouse 9 with at least one-control button 10. The operating system of the terminal 7 is for example Unix, Windows or Linux. All these operating systems are capable of recognizing peripherals such as a scanner or digitizer 13, a printer 14, or any other device 15 connected to the terminal 7, and enabling the capture of images or image sequences. The process of the invention enables the automatic digitization of the silver image 3 whose colors are altered, by using for example the scanner 13. The digitized image 3 is encoded as digital values. To digitize the image, a measuring scale of optical densities is used. In other words, the digital values associated with each pixel, and for each of the color channels forming the image, are proportional (linear function) to the optical densities. The image 3 is digitized in an image 12 that can thus be viewed on the screen 11. The digital image 12 can be saved in an internal memory of the terminal 7.

In another embodiment, the implementation of the process of the invention can also be non-interactive, and not necessarily use means comprising a display screen 11. In this embodiment, the process of the invention is implemented by using a dedicated processor; i.e. a processor configured with ports and basic software functions enabling said process to be implemented. For example an FPGA processor is used (Field Programmable Gate Array). This processor is for example integrated into the scanner 13, and automatically executes the restoration just after the digitization operation of the silver image 3.

The alteration, i.e. discoloration or fading of the colors of a silver image is caused in particular by the exposure of the silver image support to the light and/or humidity. Films are for example stored wound on reels 1; in these conditions, the alteration of the colors of the silver image 3 recorded on the film 2 occurs first in the neighborhood of the edges 4F, 5F of said film 2. Over time, color alteration is thus greater in the neighborhood of the edges 4F, 5F of the film 2 wound on the reel 1, than in that of the main axis 6 located in the center of the film 2. Consequently, a first assumption based on experimental results, and prior to the implementation of the process of the invention, consists in acknowledging on the one hand that the color alteration varies spatially in the plane of the image 3, according to a direction perpendicular to the first main axis 6, or parallel to a second main axis 19 of the image 3, 12. Thus, the color alteration varies according to the distance with regard to the edges 4F, 5F of the film 2. On the other hand, this first assumption is linked to a second one that consists in also acknowledging that the color degradation is uniform (i.e. does not vary) according to the first main axis 6, parallel to the edges 4F, 5F. This assumption of the uniformity of color degradation must be verified at least on the area of the image according to this main axis 6.

Figure 3:
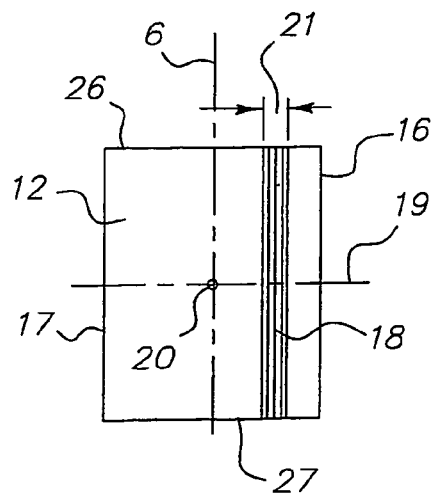
FIG. 3 represents diagrammatically a digitized image of the image to be restored.

According to the FIG. 3, and by analogy with the FIG. 1, the edges 16, 17 of the digital image 12 (digitized image 3) correspond respectively to the edges 4I, 5I of the silver image 3. The edges 26, 27 of the digital image 12 correspond to the two other edges of the silver image 3, said other edges being parallel to the second main axis 19. The first main axis 6 is perpendicular to the second main axis 19. The two main axes 6, 19 of the image 3, 12 are cut at a point 20, which is placed in the center of the image.

To determine the color density variations spatially in the plane of the digital image 12 with regard to the original color of the corresponding silver image 3, the algorithm of the process of the invention enables the pixel distributions to be calculated automatically, according to their respective optical density encoded digital values, in a moving strip 18 of the image 12. The process of the invention enables these distributions to be calculated in sections or strips 18 representative of a part of the image 12. The width 21 of the strip 18 includes for example five columns of pixels parallel to the axis 6. The length of the strip 18 corresponds to the total extent of the image 12 according to the direction of the axis 6, perpendicular to the direction of the axis 19; the direction of the axis 19 characterizes the direction of the variation of the color alteration. The total extent of the image 12 is the image dimension: for example its height or width. In a particular embodiment of the invention, the least wide strip 18 is reduced to a single row of pixels parallel to the axis 6.

Figure 4:
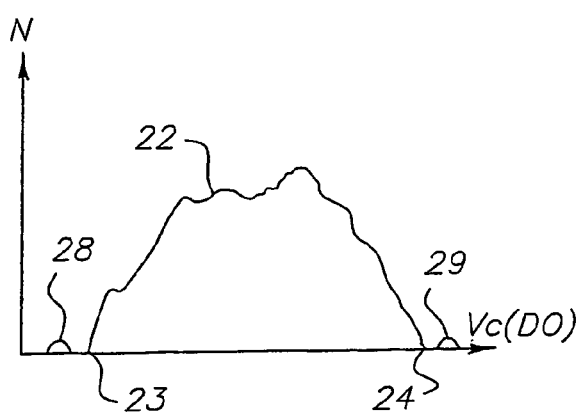
FIG. 4 represents an example of the distribution, in a color channel, of the optical densities of a pixel strip of a digital image.

FIG. 4 represents an example of the distribution of the optical densities of a pixel strip, in a given color channel, for example red. A curve 22 represents the pixel distribution (number of pixels N according to the Y axis) according to the optical density encoded values $V_C(DO)$ of said pixels (according to the X axis). The curve 22 represents, for a given spatial position of the strip 18 in the plane of the image 12, the distribution of the optical density encoded values $V_C(DO)$ of the pixels forming said strip 18, between a minimum optical density value represented by the point 23 and a maximum optical density value represented by the point 24. Generally, the image is affected by noise (interference signal). The causes of noise can be multiple. In the context of the invention, unwanted noise is mainly due to dust. Dust for example generated black spots in the image, or even white spots, and it disturbs the distribution of the optical density encoded values $V_C(DO)$. According to FIG. 4, the optical density encoded values of black spots are for example represented by a lobe 28, and optical density encoded values of the white spots are for example represented by a lobe 29. The process of the invention enables the automatic elimination of these aberrant lobes 28, 29.

Figure 8:
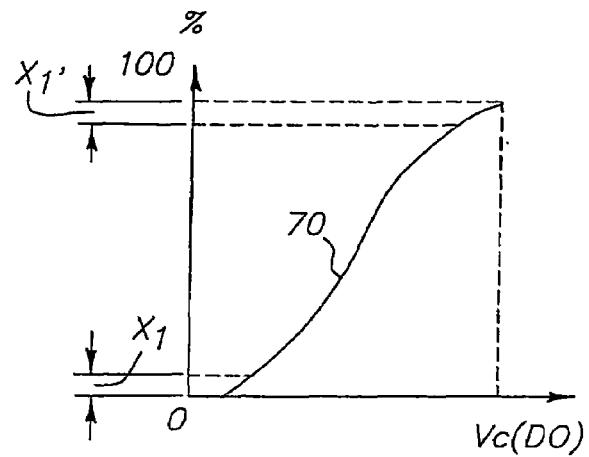
FIG. 8 represents an example of the distribution of the cumulated optical densities of FIG. 4.

FIG. 8 represents an example of the curve 70 of the distribution of the cumulated optical densities of FIG. 4. According to a particular embodiment of the invention, the cumulated distribution of FIG. 8 is for example divided into classes of equal numbers of pixels having values near to the optical densities. Preferably, the distribution is divided into hundreds (100 classes). But the distribution can be divided into another arbitrary number of classes. To eliminate any aberrant lobes 28, 29 due to the noise, the invention only processes part of the curve 70 between the respective ordinate points $X_1$ and $(100-X'_1)$. In a preferred embodiment: $X_1=X'_1=5\%$. But the values of $X_1$ and $X'_1$ can be parameterized; i.e. can take other values (percentage), and not be equal to one another.

A third assumption of implementation of the invention process consists in considering that the optical density change corresponding to the color alteration takes place according to a linear model, characterized for example by a first equation Eq (1) of the type: $D_F=\alpha D_R+\beta$.

The preferred embodiment of the invention uses the linear model by applying it to the optical densities of pixels of strips 18 of the digital image 12. In another embodiment, this linear model can also be used by applying it to the color intensities.

In the equation $D_F=\alpha D_R+\beta$, $D_F$ represents the optical density encoded value of an altered pixel, i.e. a pixel whose optical density encoded value has for example decreased with regard to the reference optical density encoded value $D_R$ of said pixel. The reference optical density encoded value $D_R$ is the optical density of the original color of the point corresponding spatially to the pixel of the digital image 12 in the plane of the silver image 3. The values of $\alpha$ and $\beta$ vary according to the main axis 19 of the digital image 12.

A fourth assumption prior to the implementation of the process of the invention, acknowledges that the actual color degradation profile of the image varies continuously (i.e. without break), smooth (i.e. with a slow variation) and monotonic (i.e. with degradation always decreasing from the edge towards the point of least degradation). The point of least degradation of the image 12 is represented for example by the point 20 placed in the center of the image 12. But this point of least degradation can be placed spatially anywhere in the plane of the image 12. The objective of the detected degradation profile is to approach the actual degradation profile. Thus, the result of color restoration is all the better as the degradation profile detected by the process of the invention is continuous, smooth, and monotonic. That is that the profile is free from the chromatic variations inherent to the contents of the image. Filtering means known to those skilled in the art, enable the detected degradation profile to be made continuous, smooth and monotonic.

In a preferred embodiment of the invention, the steps of detection of image color alteration are generally preceded by the automatic initial filtering of all the pixels of the digital image 12. The initial filtering enables the influence of the contents of the image and the dust (artifacts in the image) to be minimized. But, another particular embodiment enables not performing this initial filtering. The digital image 12 is filtered by using mathematical morphology operators known to those skilled in the art. For each pixel of the image 12, an opening (erosion followed by a dilation) is performed, then a closing (dilation followed by an erosion), by using a structuring element having for example a square shape and containing 9 or 25 pixels. This opening and closing can be performed successively n times, n being an integer.

The process of the invention enables the automatic division of the digital image 12 into pixel strips 18 arranged perpendicular to the direction of the main axis 19 of the image according to which the color alteration occurs. The joining of all the pixels of each strip 18 represents all the pixels of the image 12. The image 12 is divided into pixel strips 18 according to the adjacent parallel strips 18; according to a first embodiment, these adjacent parallel strips have no common pixel between them, or according to a second embodiment, the image is divided according to parallel strips partially overlapping by twos according to at least one row of pixels; a third embodiment enables the image to be divided at the same time into adjacent or overlapping strips. The embodiment selected from among these three variants depends on the algorithm used to displace, in the image 12, the moving strip 18 of width 21. In a preferred embodiment, the strips 18 have the same width 21. But the algorithm implementing the process of the invention also enables uneven strips 18 of widths 21 to be selected.

Figure 6:
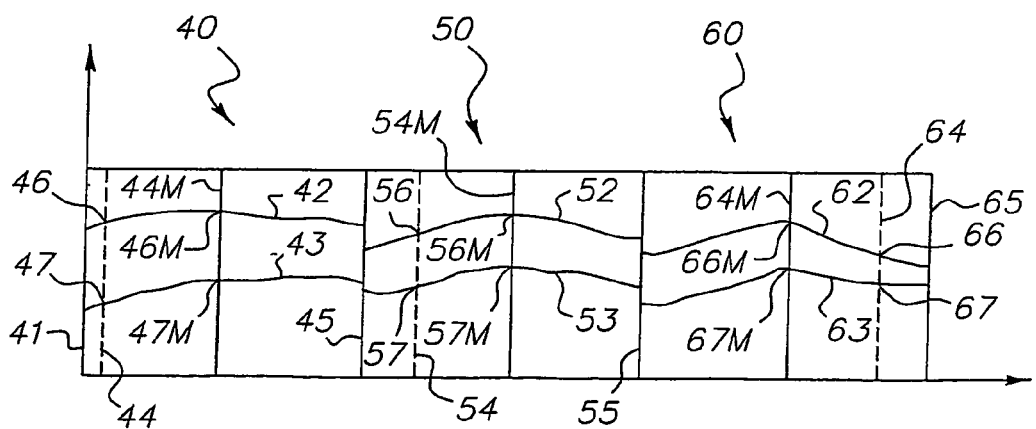
FIG. 6 represents diagrammatically an example of the diagram, in each color channel, of spatial representations of the distribution of optical densities in the image filtered of its contents.

Based on the division of the digital image 12 into pixel strips 18, the process of the invention enables the automatic calculation, for each pixel strip 18, and according to FIG. 6, for each of the planes of the colored channels 40, 50, 60 forming the image 12 (e.g. the red, green and blue channels), of an optical density distribution of each pixel of said strip 18. An example of the optical density distribution is shown in FIG. 4.

The determination of the spatial variations of the color alteration in the entire image 12, and for each of the color channels, e.g. red, green and blue, consists in separating or in filtering the contribution of the image contents, from the contribution of the color alteration. This by taking into account the variation of the distribution of the optical density encoded values, as shown in FIG. 4.

Figure 5:
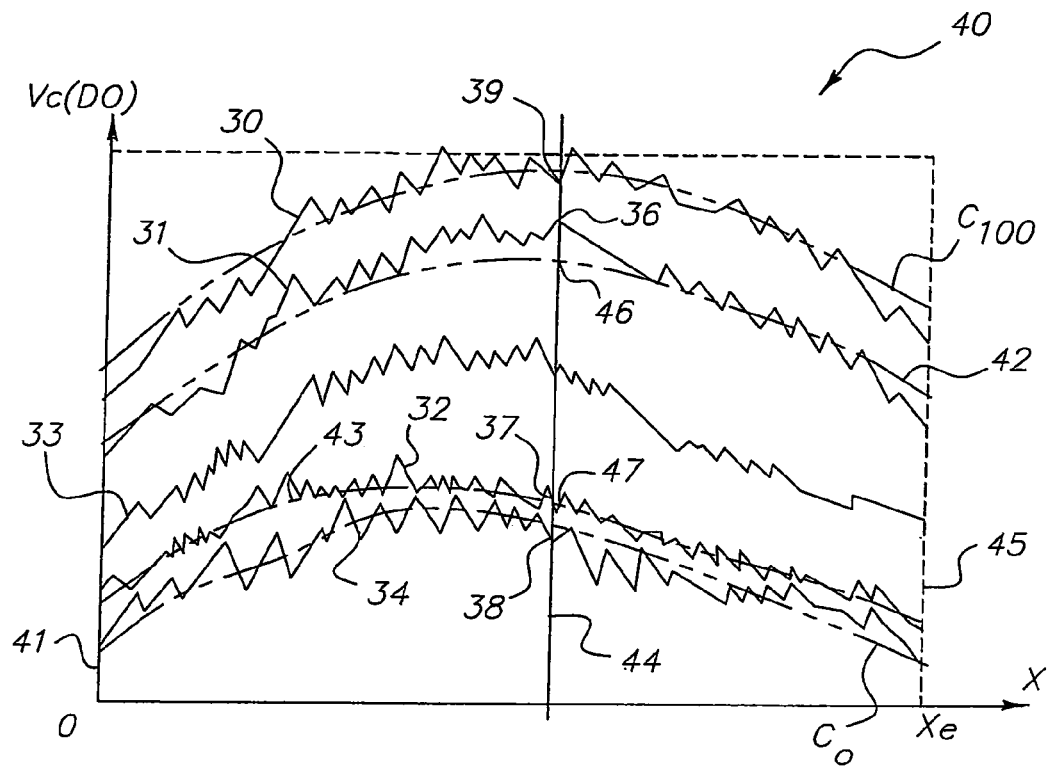
FIG. 5 represents diagrammatically, for a color channel, a development of the distribution of optical densities in the image, according to a main axis by which the color alteration occurs.

FIG. 5 shows, for one color channel of the image, a spatial representation of the actual optical density distribution in the extension Xe of said image. The extension Xe represents the dimension of the image according to which the color alteration or degradation occurs (main axis 19). The lines 41 and 45 correspond to the edges of the image. The actual optical density distribution is represented for example by curves 30, 31, 32, 33, 34. These curves 30, 31, 32, 33, 34 correspond to a mixing of the color degradation profile and contents of the image. The process of the invention enables the automatic separation of the signals linked to the image contents on the one hand, and to the color degradation profile on the other hand.

According to FIG. 5, the process of the invention enables the automatic calculation, for each of the optical density distributions of the pixels of the pixel strip 44, of a top crude reference value of optical density 36, and a bottom crude reference value of optical density 37. According to FIG. 5, the optical density distribution is represented by a family of curves 30, 31, 32, 33, 34. The curves 30 and 34 represent for example the optical density curves of the maximum and the minimum of the distribution respectively. In a preferred embodiment, the algorithm of the process of the invention automatically eliminates these two extremes of the distribution (curves 30 and 34) to perform the calculations. The top 36 and bottom 37 crude reference values are calculated from the curves 31 and 32 which correspond for example respectively to the optical density curves of the family of curves placed in the distribution, in the neighborhood respectively of the end curves 30 and 34.

However, in another embodiment, the top crude reference values of optical density 39, and bottom 38, are calculated from the optical density curves of the maximum 30 and the minimum 34.

Based on the top 36 and bottom 37 crude reference values of optical density, the process of the invention enables the top 46 and bottom 47 filtered reference values of optical density to be calculated.

Figure 9:
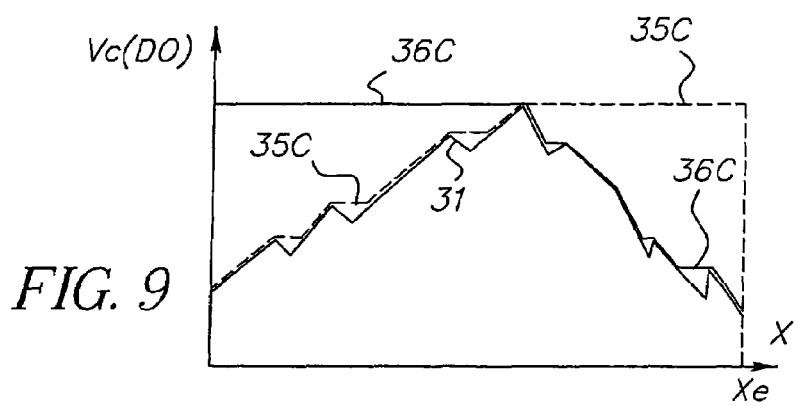
FIG. 9 represents a filtering principle of the image by following the maxima.

The process of the invention, based on the filtered reference values 46, 47, automatically determines the optical density reference curves: the optical density top reference curve 42, and the optical density bottom reference curve 43. The optical density reference curves 42, 43 are representative of the color degradation profile of the image. These reference curves 42, 43 are obtained by filtering, by taking into account the fourth assumption linked to the implementation of the invention. Fourth assumption is based on a color degradation profile of the image that varies in a continuous, smooth, and monotonic way. In a preferred embodiment, the filtering operation, whose principle is represented in FIG. 9, is performed so as to apply this fourth assumption, to eliminate the end points of the corresponding distribution, after filtering, to the end curves of the distribution $C_0$ and $C_{100}$, and to separate the image contents from the color degradation profile of said image. The curves $C_0$ and $C_{100}$ are the curves of the top and bottom optical density reference that represent the end curves of the distribution.

According to FIG. 9 and in the preferred embodiment of the invention, the filtering operation is performed by using the "following the maxima" method. This filtering method means, from a curve 31 representative of a distribution, obtaining the resultant curve that represents the minimum of the two curves 35C and 36C. This enables the dips of the initial curve 31 to be eliminated and thus the monotonic assumption to be respected. According to FIG. 6, for each of the color channels 40, 50, 60 forming the image, the top filtered reference values of optical density 46, 56, 66, and the bottom filtered reference values of optical density 47, 57, 67, are calculated based on the use of a filtering of the image 12 by the "following the maxima" method in each pixel strip 18.

Figure 10:
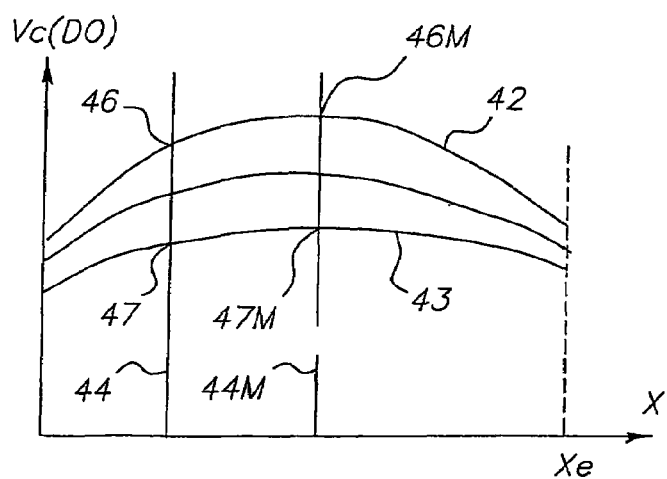
FIG. 10 represents diagrammatically, for a color channel, the distribution of the optical densities after filtering of FIG. 5.

According to FIGS. 6 and 10, the process of the invention thus enables, after filtering, smoothed corrected curves 42, 43, 52, 53, 62, 63 to be obtained. According to a preferred embodiment, the curves $C_0$ and $C_{100}$, corresponding to the ends of the distribution (0% and 100%), were excluded. FIG. 6 represents the top reference curves of optical density 42, 52, 62 and bottom 43, 53, 63 respectively. Said reference curves being represented in each plane 40, 50, 60 corresponding to the color channels. By analogy with the graphic representation of FIG. 3, the image extension by which the variation of color alteration occurs is represented in abscissa in FIG. 6 by the distance between the lines 41 and 45 for the color channel 40, between lines 45 and 55 for the color channel 50, and between lines 55 and 65 for the color channel 60. The Y-axis of FIG. 6 represents the optical density encoded values $V_C(DO)$. The photographic emulsion layer of the image 3 corresponding to the color red is represented in abscissa for example by the plane 40 of the image; the photographic emulsion layer corresponding to the color green is represented in abscissa for example by the plane 50 of the image; the photographic emulsion layer corresponding to the color blue is represented in abscissa for example by the plane 60 of the image. According to FIG. 6, the process of the invention enables the automatic determination, for each of the color channels 40, 50, 60 forming the image, and based on the maximum value of optical density 46M, 56M, 66M of the top reference curve of optical density, of the pixel strip of least degradation 44M, 54M, 64M. The top filtered reference values of optical density of the pixel strips of least degradation 44M, 54M, 64M are respectively 46M, 56M, 66M. The bottom filtered reference values of optical density of the pixel strips of least degradation 44M, 54M, 64M are respectively 47M, 57M, 67M. This pixel strip of least degradation corresponds to the pixel strip of the image having undergone a minimum alteration or degradation of color. According to a particular embodiment of the process of the invention, the strip of least degradation is the pixel strip comprising a single row of pixels, and passing through the center 20 of the image 12.

Figure 7:
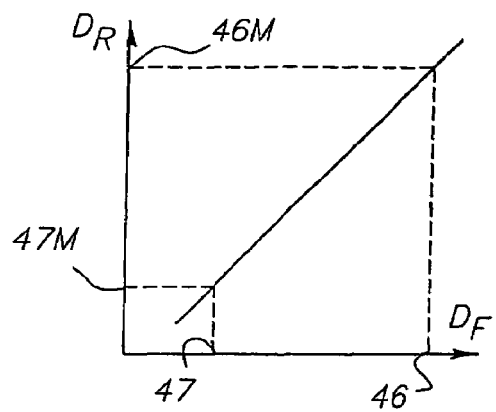
FIG. 7 represents the optical density restoration function.

FIG. 7 represents the optical density restoration function. The linear transformation is performed according to a transformation equation Eq(2) of the type: $D_R = a\, D_F + b$;

equation where a and b are independent for each colored channel, red $(a_r, b_r)$, green $(a_g, b_g)$, blue $(a_b, b_b)$, and in which a and b are determined by the algorithm enabling the process of the invention to be implemented. This second equation Eq(2) represents the reverse transformation of that of the first equation Eq(1). The simultaneous application of the equation Eq(2) in three colored channels is expressed as:

$$D_{Rr} = a_r D_{Fr} + b_r$$

$$D_{Rg} = a_g D_{Fg} + b_g$$

$$D_{Rb} = a_b D_{Fb} + b_b$$

or, as a matrix:

$$\begin{vmatrix} D_{Rr} \\ D_{Rg} \\ D_{Rb} \end{vmatrix} = \begin{vmatrix} a_r & 0 & 0 \\ 0 & a_g & 0 \\ 0 & 0 & a_b \end{vmatrix} \begin{vmatrix} D_{Fr} \\ D_{Fg} \\ D_{Fb} \end{vmatrix} + \begin{vmatrix} b_r \\ b_g \\ b_b \end{vmatrix}$$

In a particular embodiment of the invention, the non-diagonal terms of the three-row, three-column matrix, can be not zero to take into account the spectral overlapping effect of absorption, as describes for example in the above-mentioned U.S. Pat. No. 5,796,874.

According to FIGS. 6, 7 and 10, the process of the invention then enables for each pixel strip 44, 54, 64 of the digital image other than the pixel strip of least degradation 44M, 54M, 64M, and for each of the color channels forming the image, the application of a linear transformation enabling the transformation of the optical density filtered values 46, 56, 66 placed on the top reference curve of optical density 42, 52, 62 and the optical density filtered values 47, 57, 67 placed on the bottom reference curve of optical density 43, 53, 63 of said each pixel strip 44, 54, 64, respectively into top 46M, 56M, 66M and bottom 47M, 57M, 67M values of optical density of the pixel strip of least degradation 44M, 54M, 64M.

The process of the invention thus enables a digital image 12 to be obtained automatically whose colors are restored, i.e. whose colors were transformed to correspond with those of the original silver image. The operator can for example, having applied the process of the invention to an altered image, display the digital image 12 whose colors are restored, on the screen 11; they can also then reproduce this restored image, for example on paper by using a laser or ink jet printer, or on photographic film.

While the invention has been described with reference in particular to its preferred embodiments, it is apparent that variants and modifications can be produced within the scope of the claims.

What is claimed is:

1. An automatic process of color restoration of a silver image whose color is altered with regard to an original color of said silver image the color alteration not occurring evenly, spatially in the plane of the image, and according to a direction parallel to one main axis of the image; said process comprises the steps of:
   a) digitizing the altered silver image by using a measuring scale of optical densities to create a digital image;
   b) filtering all pixels of the digital image;
   c) dividing the digital image into pixel strips arranged perpendicular to a direction of a main axis of the image according to which the color alteration occurs, a joining of all the pixels of each strip representing all the pixels of the digital image;
   d) calculating for each pixel strip, and for each of color channels forming the image, a distribution of optical densities of the pixels forming said strip;
   e) calculating for each of said distributions of said step d), a top crude reference value of optical density, and a bottom crude reference value of optical density;
   f) calculating from all the top and bottom crude reference values of said step e), respectively corresponding top filtered reference values of optical density and bottom filtered reference values of optical density;
   g) determining from the top and bottom filtered reference values of optical density of said step f), respectively top reference curves of optical density and bottom reference curves of optical density, said reference curves being representative of a color degradation profile of the image;
   h) determining for each of the color channels forming the image, and from a maximum value of optical density of the top reference curve of optical density, a pixel strip of least degradation;
   i) applying to each pixel strip of the digital image other than the pixel strip of least degradation, and to each of the color channels forming the image, a linear transformation enabling a transformation of the optical density filtered values placed on the top reference curve and on the bottom reference curve of optical density of said each pixel strip, respectively into top and bottom values of optical density of the pixel strip of least degradation.

2. The process according to claim 1, wherein an initial filtering of the altered digital image is performed by using mathematical morphology operators of the type order opening (n) followed by order closing (n), with (n) being an integer.

3. The process according to claim 1, wherein the top filtered reference values of optical density, and the bottom filtered reference values of optical density, are calculated by using a filtering of the image by the method of following a maxima in each pixel strip.

4. The process according to claim 1, wherein the digital image is divided into pixel strips according to adjacent parallel strips having no common pixel between them.

5. The process according to claim 1, wherein the digital image is divided into pixel strips according to parallel strips partially overlapping by twos according to at least one row of pixels.

6. The process according to claim 1, wherein the top and bottom crude reference values of optical density correspond respectively to the optical density distribution curves placed in a neighborhood of maximum and minimum optical density curves of said distribution.

7. The process according to claim 1, wherein the top and bottom crude reference values of optical density correspond respectively to a maximum and minimum optical density distribution curves of said distribution.

8. The process according to claim 1, wherein the strip of least degradation is a pixel strip of the image comprising the pixel of maximum optical density value of the top reference curve of optical density.

9. The process according to claim 1, wherein the strip of least degradation is the pixel strip comprising a single row of pixels, said strip passing through a center of the image.

10. The process according to claim 1, wherein the planes of the color channels forming the image are the red, green and blue ones.

\* \* \* \* \*

UNITED STATES PATENT AND TRADEMARK OFFICE
CERTIFICATE OF CORRECTION

PATENT NO. : 7,443,552 B2
APPLICATION NO. : 10/519298
DATED : October 28, 2008
INVENTOR(S) : Valéry J. Risson et al.

It is certified that error appears in the above-identified patent and that said Letters Patent is hereby corrected as shown below:

Column 10, Line 35    In Claim 6, after "to" delete "the"

Signed and Sealed this

Twelfth Day of May, 2009

JOHN DOLL
*Acting Director of the United States Patent and Trademark Office*